United States Patent [19]

Traina et al.

[11] Patent Number: 5,559,279
[45] Date of Patent: Sep. 24, 1996

[54] METHOD AND APPARATUS FOR DYNAMIC CALIBRATION OF A FLOW MONITOR

[75] Inventors: John E. Traina, Glenshaw; Richard Myers, Gibsonia, both of Pa.

[73] Assignee: United Sciences, Inc., Gibsonia, Pa.

[21] Appl. No.: 375,529

[22] Filed: Jan. 19, 1995

[51] Int. Cl.$^6$ ................................................. G01F 25/00
[52] U.S. Cl. ............................................. 73/3; 364/571.01
[58] Field of Search .................... 73/3, 861.65, 202, 73/861.67; 364/571.01–571.06

[56] References Cited

U.S. PATENT DOCUMENTS

| | | | |
|---|---|---|---|
| 2,371,243 | 3/1945 | Jordan | 73/3 |
| 2,441,042 | 5/1948 | Stoll | 73/3 |
| 2,706,409 | 4/1955 | Preston | 73/212 |
| 3,518,870 | 7/1970 | Shubert et al. | 73/3 |
| 3,688,576 | 9/1972 | Obermaier et al. | 73/202 |
| 3,977,249 | 8/1976 | Wittig | 73/212 |
| 4,965,756 | 10/1990 | Pearman et al. | 73/3 |
| 5,394,759 | 3/1995 | Traina | 73/861 |

FOREIGN PATENT DOCUMENTS

| | | | |
|---|---|---|---|
| 102564 | 6/1985 | Japan | 73/861.65 |
| 2231667 | 11/1990 | United Kingdom . | |

OTHER PUBLICATIONS

Potzick, J. "On the Accuracy of Low Flow Rate Gas Calibrations at the National Bureau of Standards" vol. 25 No. 2, May 1986.

"Improved Calibration method for a five hole spherical Pitot Probe", Journal of Physics, vol. 3, Jan. 1970, pp. 21–26.

Technisches MEssen Tm, vol. 48, No. 6, Jun. 1981, Munchen De, pp. 229–232, J. Wachter, A. Heneka und K. Schweizer "Automatischer Nullabgleich fur Stromungssonden".

Appendix A, Title 40, United States Code of Federal Procedure, Part 60, Chapter 1, EPA Methods 1 and 2, pp. 481–509, Jul. 1, 1993.

*Primary Examiner*—Hezron E. Williams
*Assistant Examiner*—Nashmiya Ashraf
*Attorney, Agent, or Firm*—Buchanan Ingersoll, P.C.; Lynn J. Alstadt

[57] ABSTRACT

A method and apparatus for dynamic calibration of monitoring equipment of the type which uses a Type-S pitot tube connected to at least one transducer utilize a calibration air conduit having a distal end positioned opposite one opening of the Type-S pitot tube and a proximate end. A blower connected to the proximate end of the calibration air conduit blows air past the standard pitot tube and at least one opening of the type S pitot tube. A standard pitot tube placed in the calibration air conduit. Differential pressure readings are taken. There is a relationship between the differential pressure reading of the standard pitot tube and the differential pressure reading of the Type-S pitot tube which does not change unless the monitoring equipment of which the Type-S is a part leaks, is plugged or is otherwise operating improperly.

5 Claims, 2 Drawing Sheets

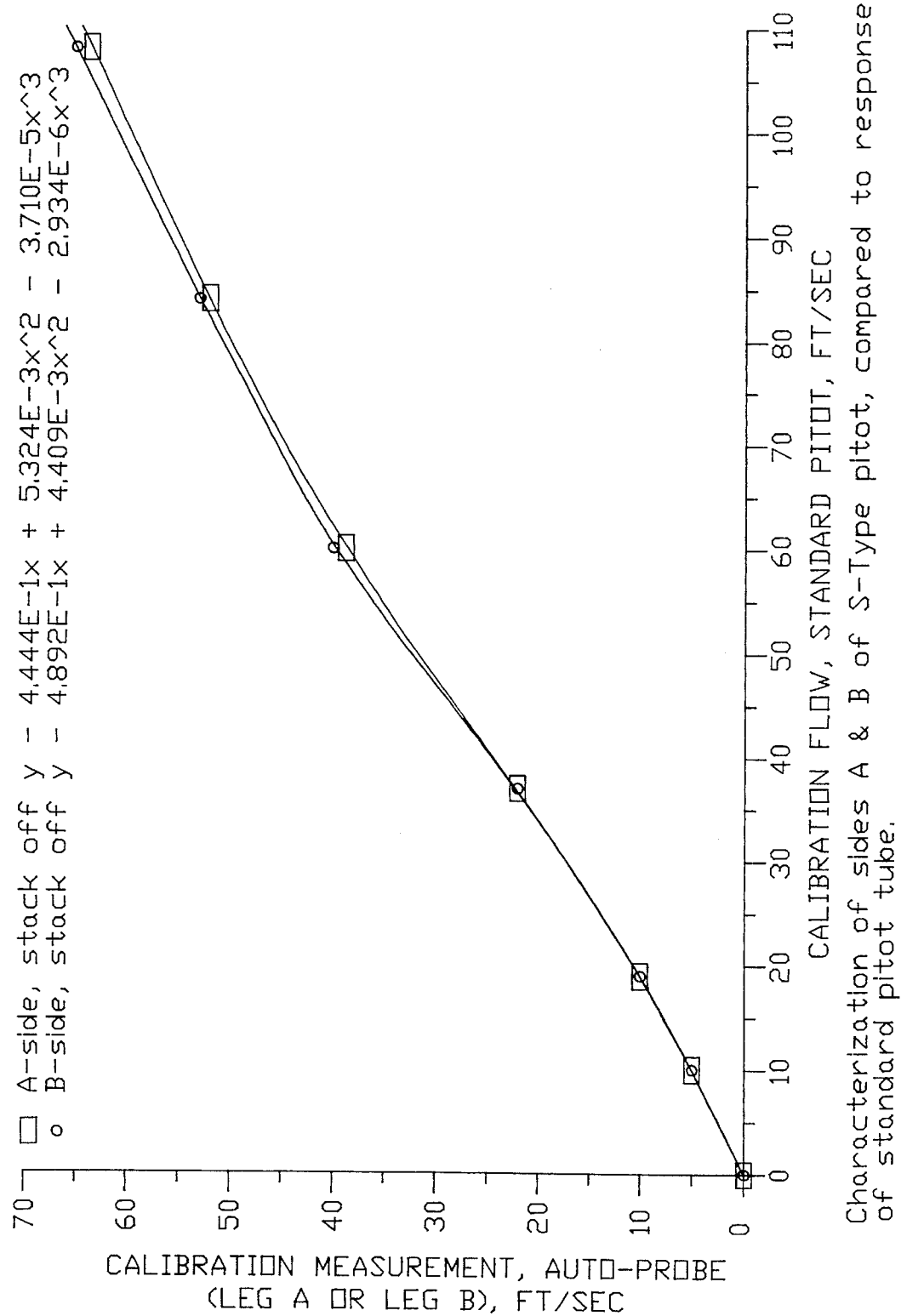

METHOD AND APPARATUS FOR DYNAMIC CALIBRATION OF A FLOW MONITOR

FIELD OF THE INVENTION

The invention relates to a method and apparatus for calibrating a probe used to measure stack gas velocity and volumetric flow rate which is useful for emissions monitoring.

BACKGROUND OF THE INVENTION

The federal government of the United States has promulgated test methods in 40 CFR Part 60, Appendix A for determining stack gas velocity and volumetric flow rate. If one knows the flow rate and has another monitor which measures the concentration of pollutants in a selected volume of fluid one can calculate the quantity of pollutants emitted over any selected time period. Accordingly, the test methods have been used in various ways, including the verification of the performance of continuous emission monitoring equipment required by other rules.

The United States has additional regulatory requirements in the form of 40 CFR, Parts 72 through 75 (acid rain reduction), which utilize the Appendix A methods. Some recent regulations now require many electric utilities to continuously measure emissions of specified pollutants on a mass per unit time basis. Adoption of these rules has put a new importance on the errors in both the continuous monitor and in the referenced test methods. The new regulations establish monetary value in the form of trading credits to a ton of $SO_2$ emissions. The value of such emissions is such that for large utilities as much as $1,000,000 per percent error in measured emissions may result.

The regulations require that calibration tests be periodically performed to assure that the continued flow monitor equipment is working properly. One type of common flow monitor used EPA compliance relies upon differential pressure ($\Delta P$) measurements using a Type-S pitot tube connected to a pressure transducer. Prior implementations of $\Delta P$ devices for CFM applications have, at most, employed a quasi-calibration technique wherein the pressure transducer is isolated from the pitot and is subjected to one or more known pressures. This procedure tests only the pressure transducer and is unable to detect pluggage, erosion, corrosion and leaks that could substantially alter the stack reading. Indeed, it has been shown that, on systems that use long lengths of pressure tubing between the pitot and the transducer, a leak of magnitude that can appreciably alter the stack ft/sec reading is not only undetectable during the daily calibration check, but is not even detectable using a manual leak check procedure.

There is a need for an accurate and convenient method and apparatus for performing calibration checks of pitot tube based continuous flow monitors.

SUMMARY OF THE INVENTION

We provide a method and apparatus for dynamic calibration of continuous flow monitoring equipment of the type which uses a Type-S pitot tube. Our method and apparatus uses a standard pitot tube placed in a well-filtered air stream of calibration air which is subsequently directed to the continuous flow monitor's Type-S pitot tube. Our system straightens the stream of air, directs the stream of air past a standard pitot tube, re-straightens the stream of air, and directs the re-straightened stream of air past one of the legs of the Type-S pitot tube. The same Type-S pitot tube is then rotated and the air is directed through the second leg. Differential pressure readings are taken of the standard pitot tube and for each leg of the Type-S pitot tube. There is a relationship between the differential pressure readings from the standard pitot tube and from each leg of the Type-S pitot tube which should not change unless the flow monitoring system of which Type-S pitot is a part has developed a leak, is plugged or is otherwise operating improperly. Because the calibration air is well filtered, the response of the standard pitot tube may be assumed to not have changed.

In normal daily operations, a calibration cycle is available during which a low flow of calibration air is sent through the calibration system. The response of the standard pitot is measured and the equivalent predicted response for one leg of the Type-S is calculated. The actual response of that leg is measured and compared to the predicted response. The probe is rotated and the other leg is similarly tested. Next, the flow is increased to a higher value and the entire process is repeated.

Our procedure tests the entire system including the pitot openings themselves. Any pluggage, leakage, erosion, corrosion or misalignment will cause the response of the Type-S, as compared to the response of the standard pitot, to change from the previously established value. It is important to note that it is not necessary to carefully control the rate of flow of the calibration air because the standard pitot tube quantifies the actual flow. Hence, an inexpensive blower may be used.

Other details, objects and advantages of the present invention will become apparent from the description of the preferred embodiment shown in the drawings.

BRIEF DESCRIPTION OF THE FIGURES

FIG. 2 is a chart showing a correlation of differential pressure readings from the standard pitot tube and the two legs of the Type-S pitot tube.

DESCRIPTION OF THE PREFERRED EMBODIMENTS

Figure 1:
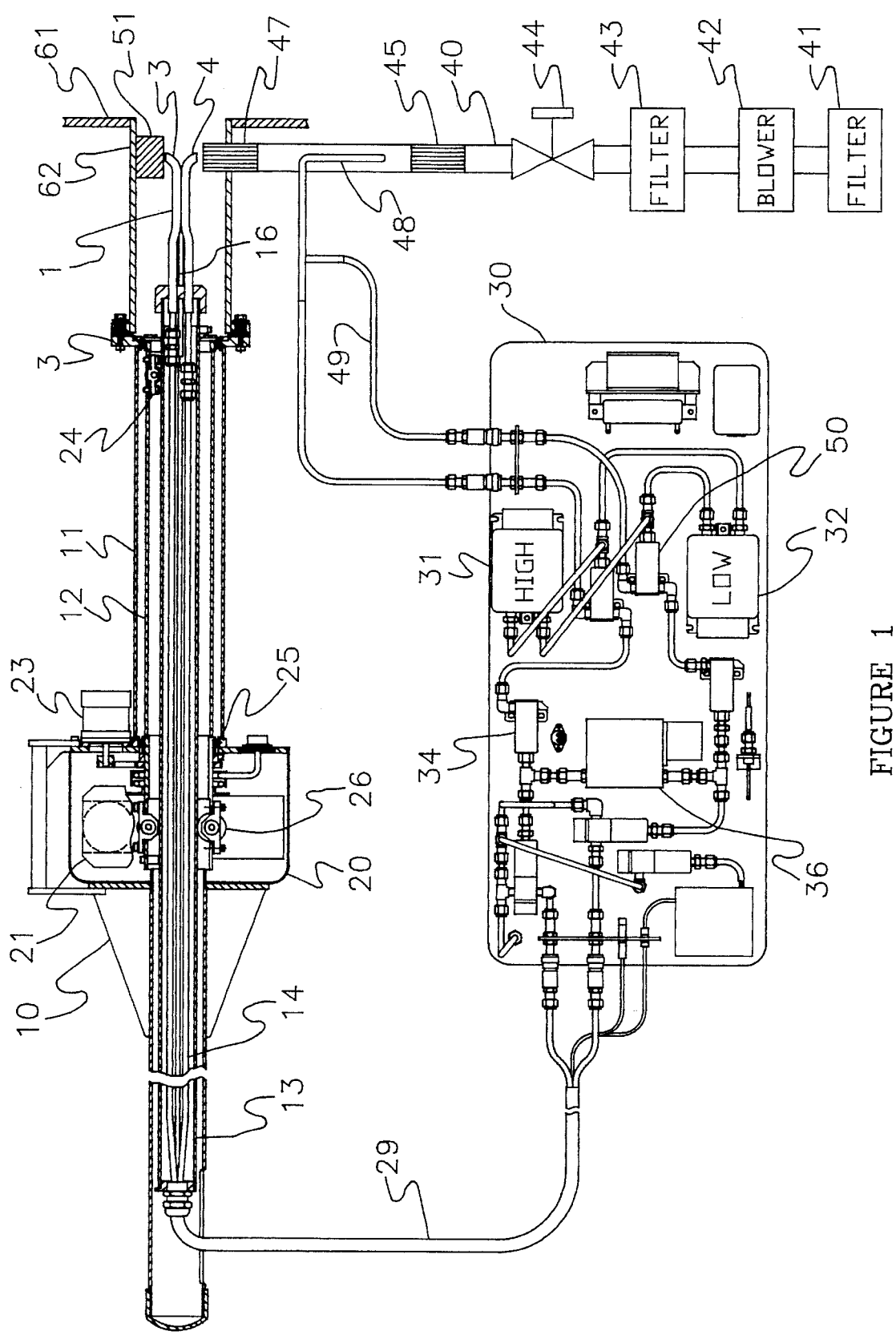
FIG. 1 is a schematic view of a present preferred probe assembly connected to our calibration system.

The present preferred probe with which our calibration method and apparatus is used is disclosed in detail in U.S. patent application Ser. No. 08/238,262, filed May 4, 1994, now U.S. Pat. No. 5,440,217. The basic configuration of that probe is shown in FIG. 1 with a present preferred embodiment of our calibration system attached. Further details of that probe and its method of operation may be found in that patent application the contents of which are hereby incorporated by reference.

Referring to FIG. 1, the preferred probe assembly 10 contains an outer tubular housing 11, middle tubular housing 12 and an inner tubular housing 13, all made of corrosion resistant metal. Two pneumatic conduits 14 run through the housing 13. A Type-S pitot tube 1 is attached to the end of the conduits 14. A third conduit 16 is preferably provided containing a temperature probe. A mounting flange 33 allows the probe assembly 10 to be mounted in a port 62 on a stack or duct 61. If desired bosses or other structures could be provided to assure that the probe assembly is always positioned in the same location when attached to the stack. Hence, tests can be repeated over time with the assurance that data is always being collected from the same points within the stack. The tubular inner housing rolls linearly on the roller assemblies 24 near the distal end of housing 12 and roller assemblies 26 near the drive motor. This housing may also rotate, on the bearing assemblies 25. Within the housing 20 there is a motor 21 for advancing and retracting housing 13 and a second motor 23 for rotating housing 13. Conduits from the Type-S pitot tube run through the housing 13 to multiple channel conduct 29 which is connected to the measurement transducers and controls contained within housing 30. The tubing is connected to respective transducers 31 and 32 through a set of valves 34. In our preferred system we have a bellows 36. Function and operation of these bellows is described in our U.S. patent application Ser. No. 08/048,273, filed Apr. 14, 1993, now U.S. Pat. No. 5,394,259. Transducers 31 and 32 provide differential pressure measurements for each leg 3 and 4 of the Type-S pitot tube. We also provide a calibration air conduit 40 connected to a blower 42. The blower directs air through a filter 43 into valve system 44. We prefer to also provide a filter 41 at the inlet of the blower 42. The valve system preferably contains a series of orifices or flow restrictors which permit the operator to change the flow rate of calibration air which is emitted therefrom. A flow straightener 45 is then positioned in front of a standard pitot tube and the calibration line 40. Air continues through line 40 into a second flow straightener 47 and is then directed into one leg 3 or 4 of the Type-S pitot tube.

We further prefer to provide a baffle 51 positioned adjacent the opening of that leg 3 or 4 of the Type-S pitot tube which is not directed toward calibration air conduit 40. As more fully explained below, calibration is done by injecting a calibration air stream first through standard pitot tube 48 and one leg 4 of the Type-S pitot tube and then rotating the probe and injecting a calibration air stream through the standard pitot tube 48 and the other leg 3 of the Type-S pitot tube.

The standard pitot tube is connected through tubing 49 to the transducers 31 and 32 through appropriate valves 50. Consequently, we are able to obtain a differential pressure reading from the standard pitot tube. The differential pressure reading corresponds to a calibration velocity measured in feet per second. The legs 3 and 4 are connected to the same transducers 31 and 32 through multiple channel conduit 29. Hence, differential pressure readings can also be obtained from these legs. Each differential pressure reading corresponds to a flow velocity which can be measured in feet per second. There is a relationship between the flow velocity at the standard pitot tube 48 and the flow velocity through each leg 3 and 4 of the Type-S pitot tube which should not change. This relationship can be found using a curve-fitting regression analysis technique. Calibration of the probe shown in FIG. 1 is done when the pitot 1 is positioned so that one opening of the pitot, namely the distal end of leg 4, is positioned adjacent the flow straightener 47 in calibration air conduit 40 as shown. Calibration air is blown through conduit 40 at a selected velocity so that the calibration air passes past the standard pitot tube 48 and also past the opening in leg 4 of the Type-S pitot tube. Differential pressure readings are taken for the standard pitot tube and for the opening in leg 4 at various flow speeds. A first relationship is then found among the readings at the various selected flow speeds using a curve-fitting regression analysis technique. After this procedure has been completed for the first opening the orientation of the pitot tube is changed so that the calibration air passes into the second opening of the pitot tube. Calibration air is blown into the second opening and the method used for the first opening is repeated. At a later point in time calibration air is blown through conduit 40 at various flow speeds and the same differential pressure readings are taken. The curve-fitting technique is applied to the new readings to find a second relationship for the system. The first and second relationships are compared. If the second relationship differs from the first relationship, that difference indicates that a leak, plugged line or other problem exists in the probe.

A test was conducted of the system shown in FIG. 1. First, the flow rates in feet per second at the standard pitot tube as well at each leg, labeled the A side and the B side, of the Type-S pitot tube were measured and the relationship determined and graphed in FIG. 2. The calibration system was then subjected to five repeated calibration cycles of three arbitrarily chosen flow rates settings for the calibration air. The data, shown in Tables 1 and 2, were taken on a simulated laboratory stack for the two cases of (a) no stack flow; and (b) flow speed in the stack of approximately 35 feet per second and a static pressure of $-0.31"$ $H_2O$. For illustrative purposes the data was treated in much the same way as the "calibration error" test for a compliance opacity monitor in which actual response is compared to an expected response and the mean difference (bias) as calculated separately from the variability (confidence coefficient) of the data. Overall accuracy is calculated of a percent of a presumed full scale of 100 feet per second. As can be seen from both tables, both the accuracy and repeatability were excellent. Similar results were obtained with the stack running or not running. Moreover, there was excellent agreement at low flow rates. Differential pressure devices are generally considered to be unreliable at low flow such as occurs at sites with high turn down ratios. It is also noteworthy that no individual calibration result approached the 3 percent error limit specified by Title 40 of the Code of Federal Regulation, Section 75 for the daily draft of a continuous flow monitor.

The data shown in the tables and in FIG. 2 is for the system that was tested. It is important to note that it is not important to repeatedly produce the exact same calibration flow from day to day. It is only necessary to produce a set of upscale flows that are approximately the desired values (for example, 10 percent, 30 percent and 60 percent of full scale) because the standard pitot tube will always be used to predict the Type-S pitot tube response from a calibration curve established for a clean, leak-free, Type-S pitot tube.

Our calibration system can be used with a conventional blower and air filter. Similarly, the preferred air supply system will utilize multiple, solenoid-activated orifices to supply different flow rates of calibration air. Therefore, our system can be used without any specially made equipment and is relatively easy to install in all types of port systems.

TABLE 1

Calibration repeatability study at three calibration levels, with no stack flow.

| Run # | Standard pitot ft/sec | Predicted A-side ft/sec | Actual A-side ft/sec | Arithmetic diff., ft/sec | Predicted B-side, ft/sec | Actual B-side, ft/sec | Arithmetic diff., ft/sec |
|---|---|---|---|---|---|---|---|
| 1 | 9.5 | 4.7 | 5.4 | +0.7 | 4.8 | 5.4 | +0.6 |
| 2 | 9.5 | 4.7 | 5.0 | +0.3 | 4.8 | 5.0 | +0.2 |
| 3 | 9.5 | 4.7 | 5.0 | +0.3 | 4.8 | 5.0 | +0.2 |
| 4 | 9.5 | 4.7 | 5.0 | +0.3 | 4.8 | 5.0 | +0.5 |
| 5 | 9.5 | 4.7 | 5.0 | +0.3 | 4.8 | 5.0 | +0.2 |
| 6 | 48.3 | 29.6 | 30.4 | +0.8 | 62.3 | 62.0 | −0.3 |
| 7 | 48.3 | 29.6 | 30.5 | +0.9 | 29.6 | 30.3 | +0.7 |
| 8 | 48.3 | 29.6 | 30.4 | +0.8 | 29.6 | 30.3 | +0.7 |
| 9 | 48.3 | 29.6 | 30.5 | +0.9 | 29.6 | 30.3 | +0.7 |
| 10 | 48.3 | 29.6 | 30.5 | +0.9 | 29.6 | 30.3 | +0.7 |
| 11 | 101.4 | 62.3 | 60.4 | −2.1 | 62.3 | 62.0 | −0.3 |
| 12 | 101.4 | 62.3 | 60.4 | −1.9 | 62.3 | 62.0 | −0.3 |
| 13 | 101.4 | 62.3 | 60.4 | −1.9 | 62.3 | 62.1 | −0.2 |
| 14 | 101.4 | 62.3 | 60.4 | −1.9 | 62.3 | 62.0 | −0.3 |
| 15 | 101.4 | 62.3 | 60.4 | −1.9 | 62.3 | 62.0 | −0.3 |
| Arithmetic Mean Difference (MD) | | | | −0.23 | | | +0.25 |
| 95% Confidence Coefficient (CC) | | | | 0.70 | | | 0.24 |
| Calibration Accuracy (as % of 100 ft/sec full scale) | | | | 0.93% | | | 0.49% |

TABLE 2

Calibration repeatability study at three calibration levels, with 35 ft/sec stack flow, and stack static pressure of −0.31" H$_2$O.

| Run # | Standard pitot ft/sec | Predicted A-side ft/sec | Actual A-side ft/sec | Arithmetic diff., ft/sec | Predicted B-side, ft/sec | Actual B-side, ft/sec | Arithmetic diff., ft/sec |
|---|---|---|---|---|---|---|---|
| 1 | 9.1 | 4.5 | 5.0 | +0.5 | 4.6 | 5.0 | +0.4 |
| 2 | 9.1 | 4.5 | 5.0 | +0.5 | 4.6 | 5.0 | +0.4 |
| 3 | 9.1 | 4.5 | 5.0 | +0.5 | 4.6 | 5.0 | +0.4 |
| 4 | 9.1 | 4.5 | 5.0 | +0.5 | 4.6 | 5.0 | +0.4 |
| 5 | 9.1 | 4.5 | 5.0 | +0.5 | 4.6 | 5.0 | +0.4 |
| 6 | 49.0 | 30.2 | 30.6 | +0.4 | 30.1 | 30.1 | 0.0 |
| 7 | 49.0 | 30.2 | 30.6 | +0.4 | 30.1 | 30.3 | +0.2 |
| 8 | 49.0 | 30.2 | 30.6 | +0.4 | 30.1 | 30.2 | +0.1 |
| 9 | 49.0 | 30.2 | 30.7 | +0.5 | 30.1 | 30.2 | +0.1 |
| 10 | 49.0 | 30.2 | 30.7 | +0.5 | 30.1 | 30.2 | +0.1 |
| 11 | 100.0 | 60.6 | 61.1 | +0.5 | 62.2 | 60.3 | −1.9 |
| 12 | 100.0 | 60.6 | 61.0 | +0.4 | 62.2 | 60.4 | −1.8 |
| 13 | 100.0 | 60.6 | 61.0 | +0.4 | 62.2 | 60.3 | −1.9 |
| 14 | 100.0 | 60.6 | 61.0 | +0.4 | 62.2 | 60.4 | −1.8 |
| 15 | 100.0 | 60.6 | 61.0 | +0.4 | 62.2 | 60.4 | −1.8 |
| Arithmetic Mean Difference (MD) | | | | +.39 | | | −0.45 |
| 95% Confidence Coefficient (CC) | | | | 0.14 | | | 0.57 |
| Calibration Accuracy (as % of 100 ft/sec full scale) | | | | 0.53% | | | 1.02% |

Although we have described and shown a certain present preferred embodiment of our invention, it should be distinctly understood that the invention is not limited thereto, but may be variously embodied within the scope of the following claims.

We claim:

1. A method for calibrating monitoring equipment of the type which uses a Type-S pitot tube connected to at least one transducer, the Type-S pitot tube having a first opening and a second opening comprising the steps of:

a. placing a calibration air conduit having a distal end so that the distal end is adjacent the first opening of the Type-S pitot tube;

b. placing a standard pitot tube within the calibration air conduit;

c. blowing calibration air at a selected speed through the calibration air conduit so that the calibration air passes past the standard pitot tube and also past the first opening of the Type-S pitot tube;

d. making first differential pressure readings for the standard pitot tube and for the first opening of the Type-S pitot tube at various flow speeds;

e. finding a relationship between the readings first over a range of flow speeds, using a curve-fitting regression analysis technique;

f. repeating steps c, d and e at a subsequent time; and g. checking to see if the relationship found in step f differs from the relationship previously found in step e.

2. The method of claim 1 also comprising the steps of:

h. changing the relative orientation of the Type-S pitot tube and the distal end of the calibration air conduit so that the calibration air passes through the standard pitot tube and into the second opening of the Type-S pitot tube;

i. making second differential pressure readings for the standard pitot tube and the second opening of the Type-S pitot tube for various flow speeds;

j. finding a relationship between the second readings for various flow speeds using a curve-fitting regression analysis;

k. repeating steps h, i and j at a subsequent time;, and l. checking to see if the relationship found in step k differs from the relationship previously found in step j.

3. The method of claim 1 also comprising the step of filtering the calibration air.

4. The method of claim 1 also comprising the step of straightening the calibration air before that air passes through the standard pitot tube.

5. The method of claim 1 also comprising the step of straightening the calibration air before that air passes into the Type-S pitot tube.

* * * * *